United States Patent
Kangas et al.

(10) Patent No.: US 6,356,763 B1
(45) Date of Patent: Mar. 12, 2002

(54) DOWNLINK OBSERVED TIME DIFFERENCE MEASUREMENTS

(75) Inventors: Ari Kangas, Uppsala; Erik Larsson, Kista, both of (SE); Sven Fischer, Nürnberg (DE); Patrik Lundqvist, Solna; Mats Cedervall, Vallentuna, both of (SE)

(73) Assignee: Telefonaktiebolaget LM Ericsson (Publ) (SE)

( * ) Notice: Subject to any disclaimer, the term of this patent is extended or adjusted under 35 U.S.C. 154(b) by 0 days.

(21) Appl. No.: 09/186,192

(22) Filed: Nov. 4, 1998

Related U.S. Application Data

(63) Continuation-in-part of application No. 09/131,150, filed on Aug. 7, 1998.

(51) Int. Cl.[7] .................................................. H04Q 7/20
(52) U.S. Cl. ......................... 455/456; 455/422; 455/502; 370/324; 342/457
(58) Field of Search .............................. 455/12.1, 67.4, 455/67.6, 422, 427, 432, 436, 456, 502, 503; 342/457; 370/324, 320, 321

(56) References Cited

U.S. PATENT DOCUMENTS

| | | | | |
|---|---|---|---|---|
| 5,014,344 A | * | 5/1991 | Goldberg ..................... | 45/67.6 |
| 5,218,717 A | * | 6/1993 | Reithberger ................ | 455/67.6 |
| 5,293,645 A | * | 3/1994 | Sood .......................... | 455/67.6 |
| 5,317,323 A | | 5/1994 | Kennedy et al. ............. | 342/457 |
| 5,327,144 A | | 7/1994 | Stilp et al. ................... | 342/387 |
| 5,365,516 A | | 11/1994 | Jandrell ........................ | 370/18 |
| 5,367,524 A | * | 11/1994 | Rideout, Jr. et al. ......... | 370/324 |
| 5,512,908 A | | 4/1996 | Herrick ....................... | 342/387 |
| 5,519,760 A | | 5/1996 | Borkowski et al. ........... | 379/59 |
| 5,542,100 A | | 7/1996 | Hatakeyama ............... | 455/56.1 |
| 5,600,706 A | | 2/1997 | Dunn et al. .................... | 379/59 |
| 5,613,211 A | * | 3/1997 | Matsuno ..................... | 455/67.6 |
| 5,629,710 A | | 5/1997 | Sawada ....................... | 342/457 |
| 5,711,003 A | | 1/1998 | Dupuy ........................ | 455/436 |
| 5,724,243 A | * | 3/1998 | Westerlage et al. ......... | 342/457 |
| 5,758,288 A | | 5/1998 | Dunn et al. .................. | 455/456 |
| 5,784,368 A | * | 7/1998 | Weigand et al. ............. | 455/502 |
| 5,875,402 A | * | 2/1999 | Yamawaki ................... | 455/502 |

FOREIGN PATENT DOCUMENTS

| | | | | |
|---|---|---|---|---|
| WO | 9526510 | | 10/1995 | ............. G01S/5/06 |
| WO | 9635306 | | 11/1996 | ............ H04Q/7/38 |
| WO | 96/35306 | * | 11/1996 | |

OTHER PUBLICATIONS

Nokia T1P1.5/98–244R1, Jul. 1998, "Mobile Station Based Location Calculation in E–OTD Method", Timo Rantalainen.

* cited by examiner

Primary Examiner—Nay Maung
(74) Attorney, Agent, or Firm—Jenkens & Gilchrist

(57) ABSTRACT

A mobile communication station in a wireless communication network is used to measure the respective times of arrival of radio signals respectively transmitted by a plurality of radio transmitters in the network. The mobile communication station is provided with real time difference information indicative of differences between a time base used by a radio transmitter serving the mobile communication station and respective time bases used by the other radio transmitters. The mobile communication station determines, in response to the real time difference information and relative to the time base used by the radio transmitter serving the mobile communication station, a plurality of points in time at which the respective radio signals are expected to arrive at the mobile communication station. For each radio signal, the mobile communication station monitors for arrival of the radio signal during a period of time after the point in time at which the radio signal is expected to arrive.

41 Claims, 6 Drawing Sheets

DOWNLINK OBSERVED TIME DIFFERENCE MEASUREMENTS

This application is a continuation-in-part of U.S. Ser. No. 09/131,150 filed on Aug. 7, 1998.

FIELD OF THE INVENTION

The invention relates generally to locating the position of a mobile communication unit in a wireless communication network and, more particularly, to making downlink observed time difference measurements.

BACKGROUND OF THE INVENTION

The ability to locate the position of a mobile communication unit operating in a wireless communication system (for example, a cellular communication system) provides many well known advantages. Exemplary uses of such position location capability include security applications, emergency response applications, and travel guidance applications. Several known techniques for providing position location involve the measurement of certain characteristics of communication signals, such as the time of arrival (TOA), the round trip delay, or the angle of arrival of a communication signal. Some of these techniques can be further divided into uplink or downlink approaches. In the uplink category, a base transceiver station (BTS) or other receiver performs the measurements on communication signals originating at a mobile communication unit (or mobile station). In downlink approaches, the mobile station performs the measurements on signals originating at base transceiver stations or other transmitters.

One example of a downlink technique for locating the position of a mobile station is the observed time difference (OTD) technique. This technique will now be described with respect to the Global System for Mobile Communication (GSM), which is exemplary of a cellular communication system in which downlink observed time difference techniques are applicable. The OTD technique is implemented, for example, by having the mobile station measure the time difference between arrival times of selected radio signals transmitted from different base transceiver stations. Assuming the geometry shown in FIG. 1, and further assuming that two signals are transmitted simultaneously from the base transceiver stations BTS1 and BTS2, and letting T1 and T2 denote the times of arrival of the respective signals at the mobile station, then the observed time difference OTD is given by the following equation:

$$T1-T2=(d1-d2)/c, \tag{Eq. 1}$$

where d1 and d2 are the respective distances from BTS1 and BTS2 to the mobile station. The locations of BTS1 and BTS2 are known, and the possible locations of the mobile station are described by the hyperbola 15 shown in FIG. 1. By combining measurements from at least three base transceiver stations, a position estimate for the mobile station can be obtained.

Most conventional cellular communication systems (including GSM systems) are asynchronous, that is, each base transceiver station uses its own internal clock reference to generate its frame and time slot structure. Therefore, the frame structures of the different base transceiver stations will tend to drift in time relative to one another, because clocks are not perfectly stable. As a consequence, an OTD measurement is not really meaningful for locating the position of a mobile station unless the differences in timing between the base transceiver stations being used is known. This difference, often referred to as the real time difference or RTD, represents the actual difference in absolute time between the transmission of respective signals (e.g., respective synchronization bursts in GSM) from respective base transceiver stations, which signals would be transmitted simultaneously if the frame structures of the base transceiver stations were perfectly synchronized.

Among several possible approaches to determine the real time difference RTD between base transceiver stations, two conventional examples are: absolute time stamping in the respective base transceiver stations; and use of stationary reference mobiles located in known positions. In the latter example, the reference mobile measures downlink signals sent from various base transceiver stations. Because the respective distances between the various base transceiver stations and the stationary reference mobile station are known, the expected time difference in arrival times of the respective signals from the base transceiver stations can be easily calculated. The real time difference RTD between base transceiver stations is simply the difference between the expected time difference of arrival and the observed time difference of arrival actually observed at the reference mobile station. The reference mobile station can periodically make the downlink time of arrival measurements and report them to a mobile location node in the network so that the network can maintain an updated record of the RTDs.

The techniques underlying known OTD methods are very similar to procedures used conventionally by mobile stations to synchronize to a serving base transceiver station and make measurements on a number of neighboring base transceiver stations as instructed by the serving cell (as in mobile assisted hand-off operations). The mobile station needs to know which base transceiver stations are to be monitored for OTD measurements. This information can typically be provided in conventional system information messages broadcasted in the cell, for example on a GSM cell's BCCH (broadcast control channels) frequency. This system information typically includes a list of frequencies of neighboring cells which are to be measured. The mobile station scans the designated frequencies to detect a frequency correction burst, which is an easily identifiable burst that appears approximately every 50 ms in GSM.

After successful detection of a frequency correction burst, the mobile station knows that in GSM the next frame will contain a synchronization burst SB. The synchronization burst SB contains the Base Station Identity Code (BSIC) and information indicative of the frame number of the current frame in which the burst SB is occurring. The mobile station measures the time of arrival of the synchronization burst SB at the mobile station relative to the timing of mobile station's own serving cell. Since now the mobile station knows the frame structure of the neighboring base transceiver station relative to its own serving base transceiver station timing, it is possible to repeat the time of arrival measurements to improve accuracy. This procedure is repeated until all frequencies (i.e., all BTSs) on the list have been measured. The observed time difference values recorded by the mobile station are then transferred to a mobile station location node in the cellular system, which node performs the position determination based on the observed time difference values, the real time difference values and the geographic locations of the base transceiver stations.

Because the mobile station does not know when the frequency correction burst (and thus the following synchronization burst SB) will appear, the brute force method described above, namely monitoring for the frequency correction burst, must be used.

The time required to capture a synchronization burst will depend on the measurement mode. OTD measurements can be made, for example, when call setup is being performed on a GSM SDCCH (Stand-alone Dedicated Control Channel), or during idle frames when the mobile station is in call mode, or during speech interrupt. For example, if the mobile station makes the measurements in call mode, then the mobile station can only make measurements during idle frames, which conventionally occur in GSM systems every 120 ms. The probability that a particular synchronization burst will appear within the idle frame is approximately 1 in 10, because the synchronization burst conventionally occurs once every ten frames in GSM. Accordingly, on average, 5 idle frames will be needed, meaning 0.6 seconds per base transceiver station. Thus, if it is desired to measure at least 6 neighboring base transceiver stations, an average measurement time of 3 or 4 seconds will be required, which may be prohibitively long in many applications.

The mobile station is guaranteed to have measured the synchronization burst SB if the mobile station captures and stores all signals (for example, all signals on the BTS's BCCH frequency in GSM) for 10 consecutive frames. However, providing the mobile station with the memory and computational capacity to capture (and thereafter process) all signal information in 10 consecutive frames is disadvantageously complex.

Moreover, in areas such as urban areas characterized by high interference levels, and in rural areas with large distances between base transceiver stations, the probability of detecting the synchronization burst SB may be unacceptably low, because the signals will typically be characterized by low signal-to-noise ratios.

Due also to the low signal-to-noise ratio, it is typically very difficult to decode the BSIC in the synchronization burst SB. The probability of taking ghost spikes instead of a synchronization burst SB is therefore disadvantageously increased in instances of low signal-to-noise ratio.

For locating a mobile station operating in a network using a Code Division Multiple Access (CDMA) air interface, one known downlink OTD approach, which has been proposed for standardization, uses some conventional cell-search signals provided in the CDMA network. This known downlink OTD approach is also referred to hereinafter as the "proposed" approach or technique. Examples of conventional mobile communication systems that employ a CDMA air interface include so-called Wideband CDMA (WCDMA) systems such as the ETSI Universal Mobile Telecommunication System (UMTS) and the ITU's IMT-2000 System. In such systems, the proposed downlink OTD positioning technique is performed by the mobile station during predetermined idle periods wherein the mobile station's serving base transceiver station ceases all transmission in order to enhance the mobile station's ability to detect signals transmitted by neighboring base transceiver stations. Certain signals conventionally provided for cell-searching in the aforementioned CDMA systems, namely a first search code (FSC) and a second search code (SSC), are also used in performing downlink OTD positioning.

During the idle period(s) of its serving base transceiver station, a mobile station uses a matched filter that is matched to the first search code FSC, just as is done in conventional cell-searching. The FSC is conventionally transmitted by all base transceiver stations in CDMA networks such as mentioned above. The FSC is 256 chips long and is transmitted by each base transceiver station once every time slot, that is, one tenth of the time (each time slot is 2,560 chips long). Each ray of each base transceiver station within the mobile station's hearable range results in a peak in the signal output from the matched filter. In the conventional peak detection process, the results from several time slots are typically combined non-coherently to improve the peak detection. In conventional cell-searching, the mobile station typically chooses the strongest detected peak. However, in the proposed downlink OTD positioning technique, the time of arrival (TOA) of each detected peak is measured by the mobile station using conventional time of arrival measurement techniques, so the observed time differences (OTDs) between the times of arrival of the respective peaks can be calculated.

Each base transceiver station operating in the aforementioned CDMA networks also conventionally transmits an associated second search code (SSC), which includes a set of 16 codes arranged and transmitted in a certain order. The 16 codes are transmitted sequentially, one code per time slot, and each of the 16 codes is transmitted simultaneously with the FSC transmitted in that time slot. The exemplary conventional CDMA systems mentioned above have 16 time slots per frame, so the entire SSC pattern, including all 16 codes, is repeated once every frame. The SSC pattern, with its 16 codes arranged in a certain order, specifies, from among a plurality of possible code groups, a single code group associated with the base transceiver station. Each code group includes a plurality of CDMA spreading codes, and each base transceiver station uses one of the spreading codes from its associated code group.

For each base transceiver station within hearable range, a mobile station performing the proposed downlink OTD positioning technique correlates the temporal location of that base transceiver station's FSC peak with the 16 codes of its SSC pattern, just as is done in conventional cell-searching. This correlating process typically uses non-coherent combining. If the peak is successfully correlated with an SSC pattern, then this correlation result indicates the code group associated with the base transceiver station that produced the FSC peak.

The FSC peak timing (i.e., the measured TOAs and/or OTDs) and the code group for each detected base transceiver station can then be reported to a mobile location node in the network, along with power and quality measurements made during the FSC peak detection process and during the FSC-SSC correlation process.

The mobile location node already knows the RTDs among the base transceiver stations (conventionally obtained from, e.g., absolute time stamping in the base transceiver stations, or a stationary reference mobile station), and thus knows, within a range of uncertainty due to the unknown location of the mobile station, when the mobile station should have received the FSC peak from any given base transceiver station. Using this known RTD information, in combination with the aforementioned peak timing, power and quality information received from the mobile station, the mobile location node can identify the base transceiver station corresponding to each FSC peak.

For example, if the location of the mobile station is known within a 4.5 kilometer range of uncertainty, this range corresponds to 64 chips. If the frame structure timing of one candidate base transceiver station differs from that of another candidate base transceiver station in the same code group by more than the 64 chip uncertainty, then the correct one of those base transceiver stations can always be determined. Assuming that the frame structure timing of each base transceiver station is random, the probability that any two base transceiver stations will have a frame structure timing difference therebetween (that is, a real time difference RTD) of 64 chips or less is 64/40,960, because each frame includes 40,960 chips (16 timeslots×2560 chips/timeslot). Thus, the probability that a peak produced by one base transceiver station can be distinguished from a peak produced by another base transceiver station of the same code group is 99.8% (1-64/40,960). The other 0.2% of situations can be handled by more advanced schemes, for instance by using power measurements and by choosing the base transceiver station that gives the best fit in a conventional location-determining cost-function.

Once each FSC peak has been matched to its corresponding base transceiver station, the TOA and/or OTD information can be used, in combination with the known RTD information and the known geographical locations of the base transceiver stations, to determine the geographical position of the mobile station.

The proposed downlink OTD positioning technique has the following exemplary disadvantages. Because the timing of the neighboring (non-serving) base transceiver stations is completely unknown to the mobile station when it begins the downlink OTD process, the mobile station must perform the FSC-SSC correlation processing for the entirety of its base transceiver station's idle period(s). Thus, the matched filter used in detecting the FSC peak must disadvantageously operate for the entire length of each idle period. Also, because the codes in the SSC pattern are different in each time slot, the mobile station must correlate with several SSCs, and then save the results for non-coherent combining. This disadvantageously requires additional computation capability and additional memory.

Because the FSC-SSC correlation processing must sequentially follow the FSC peak detection, the acquisition time in the proposed downlink OTD approach can be disadvantageously long. Also, urban areas characterized by high interference levels, and rural areas with large distances between base transceiver stations, can make it difficult, and sometimes impossible, to detect the FSC and the SSC with sufficient probability.

Another problem is that the codes associated with different base transceiver stations have quite high cross-correlations, because the FSC codes are all identical and because the 16 codes of each SSC pattern represent a subset produced from a set of 17 unique codes. These high cross-correlations do not die out with increased numbers of combined correlations, because the same codes are repeated in every frame. This disadvantageously increases the probability that the mobile station may correlate a given FSC peak to the wrong SSC pattern, especially if the FSC from a strong base transceiver station arrives temporally close to the FSC from a weaker base transceiver station.

It is desirable in view of the foregoing to improve the mobile station's ability to detect downlink signals used in known downlink observed time difference approaches.

The present invention attempts to overcome the aforementioned disadvantages of known downlink observed time difference approaches by providing for improved sensitivity in detecting the downlink communication signals used for making observed time difference measurements at mobile stations.

DETAILED DESCRIPTION

Figure 1:
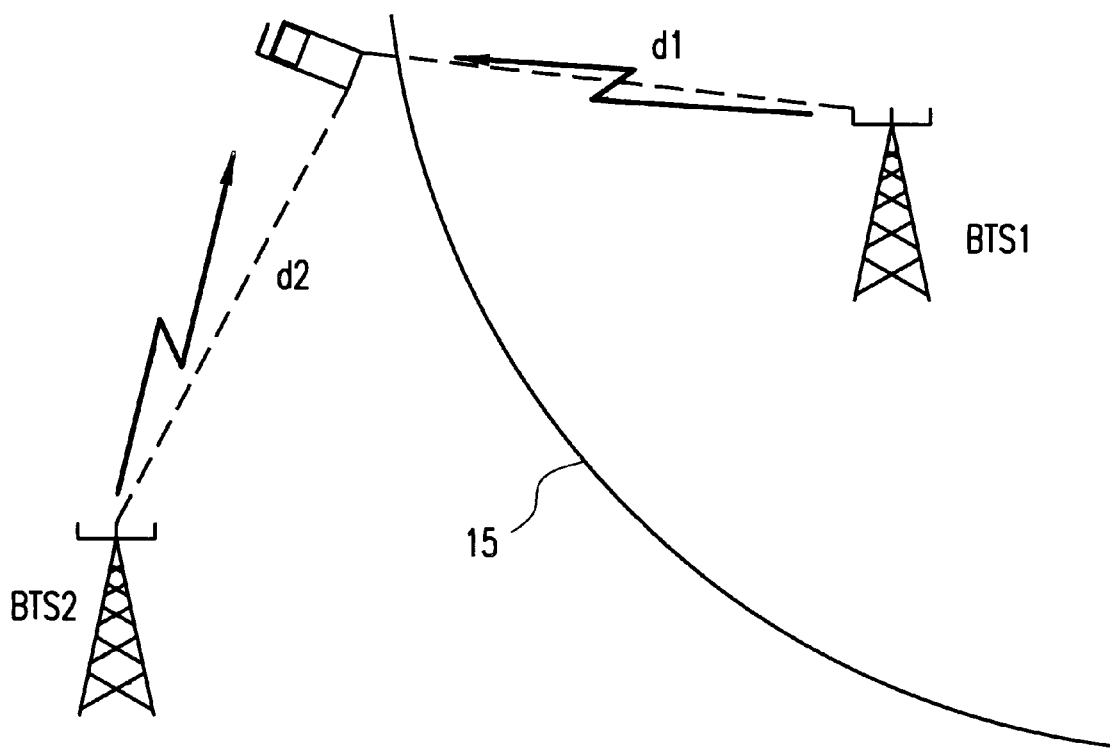
FIG. 1 diagrammatically illustrates how the location of a mobile station can be determined using downlink observed time difference measurements.
Figure 2:
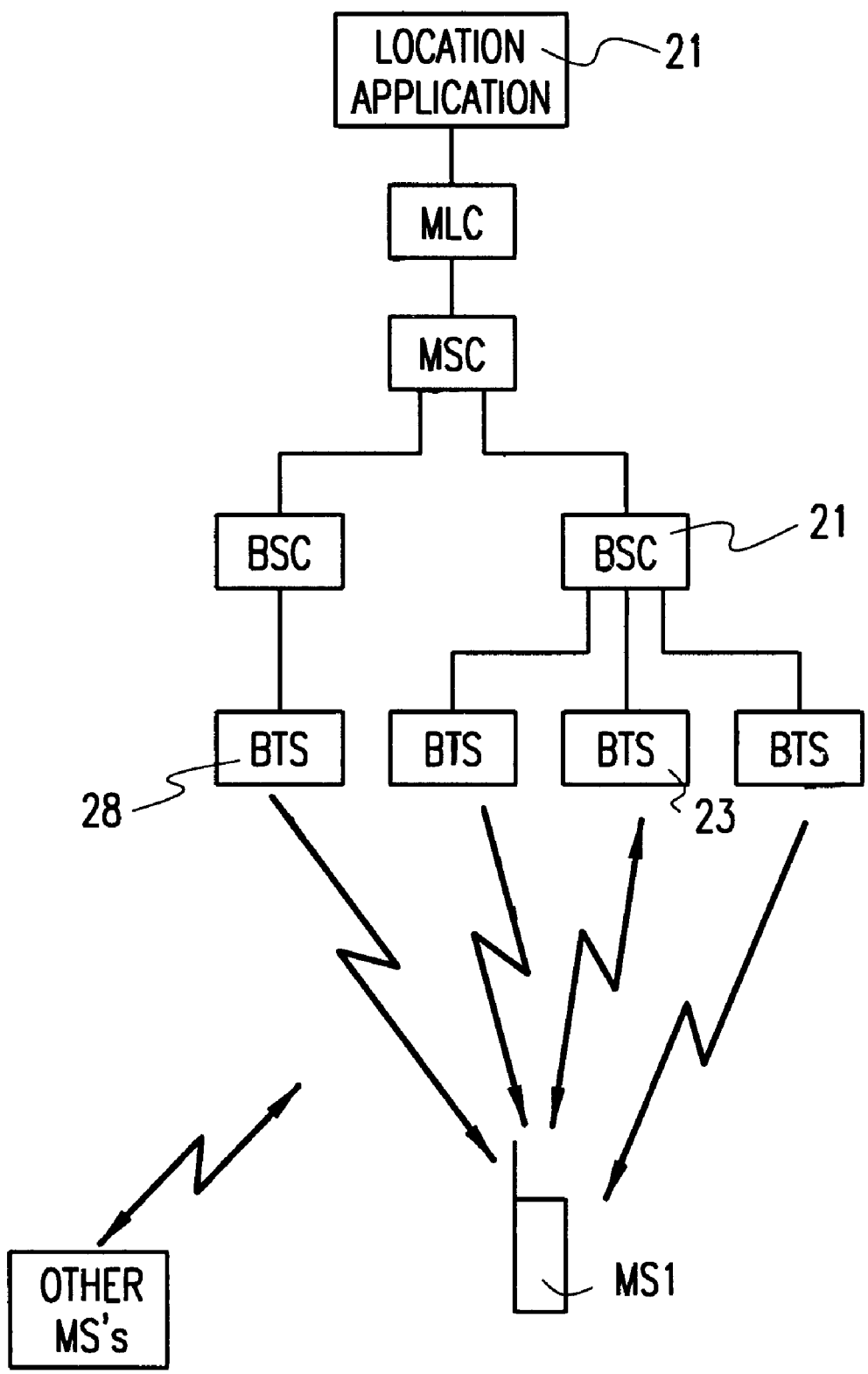
FIG. 2 is a block diagram of an exemplary wireless communications system including downlink observed time difference measurement capability according to the present invention.

FIG. 2 illustrates one example of a pertinent portion of a wireless communication system including the downlink observed time difference measurement capability according to the present invention. The invention is implemented in a GSM network in the example of FIG. 2. As shown in FIG. 2, a GSM mobile switching center MSC is coupled for communication with a plurality of GSM base station controllers BSCs, which are in turn coupled to communicate with one or more GSM base transceiver stations BTSs. The base transceiver stations are capable of radio communication with a plurality of mobile stations MSs via the air interface. Communication from the MSC to the MSs via the BSCs and the BTSs is well known in the art.

FIG. 2 also includes a mobile location center MLC coupled to communicate bidirectionally with the mobile switching center MSC using conventional GSM signaling protocol. In FIG. 2, the MLC can receive a request to locate the position of a mobile station MS1. Such a request is typically received from a location application 21 coupled to communicate with the MLC. The location application 21 can be a node within the network itself, or an external location application. In response to the request to locate the position of mobile station MS1, the MLC interrogates the network to thereby determine the serving BTS 23 (i.e., the serving GSM cell), and decides which BTSs should be selected for the downlink observed time difference measurements.

The MLC can then generate a positioning request message for mobile station MS1, indicating the frequencies and BSICs (the BSICs are conventionally available in networks such as the GSM network) of the base transceiver stations selected to be monitored, and the real time differences RTDs between the serving BTS and each of the selected BTSs. The positioning request message can be communicated from the MLC to MS1 via MSC, BSC 21, BTS 23, and the air interface between BTS 23 and MS1. Because MS1 knows when synchronization bursts will arrive from its own serving BTS, MS1 can use the RTD information to calculate approximately when synchronization bursts will arrive from the selected neighboring BTSs. This will be described in more detail hereinafter.

The aforementioned information can also be sent to MS1 as a dedicated message during, for example call setup. Moreover, the aforementioned information can also be sent to MS1 periodically on a broadcast control channel as a system information message. The RTDs can be calculated by the MLC using OTD information received from a reference mobile station, as described hereinabove, or the RTDs can be provided to the MLC using other conventional techniques.

Figure 3:
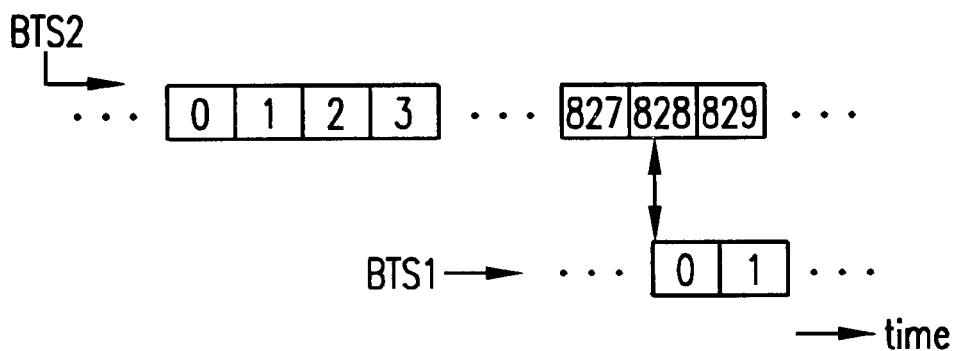
FIG. 3 illustrates one example of relative timing difference between base transceiver stations such as shown in FIG. 2.
Figure 4:
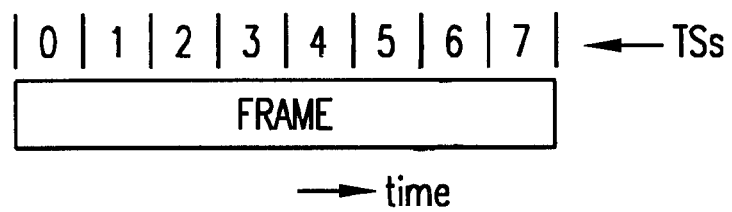
FIG. 4 illustrates an exemplary time slot structure of the frames of FIG. 3.
Figure 5:
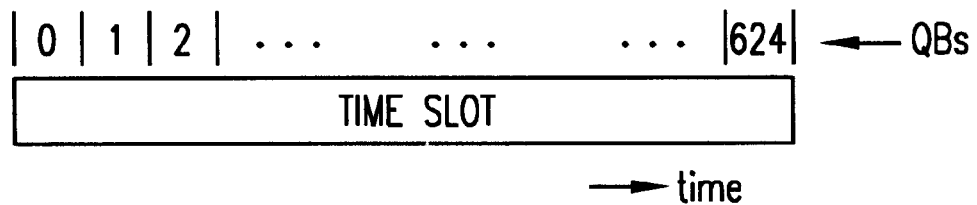
FIG. 5 illustrates an exemplary quarter bit structure of the time slot of FIG. 4.

FIGS. 3–5 illustrate the concept of real time differences among base transceiver stations in GSM networks such as the example GSM network portion of FIG. 2.

FIG. 3 illustrates the real time difference between the frame structure timing of a pair of base transceiver stations designated in FIG. 3 as BTS2 and BTS1. In GSM, the TDMA frames used by the base transceiver stations are numbered in a repetitive cyclic pattern, each cycle (also called a hyperframe) including 2,715,648 frames numbered as frame 0 through frame 2,715,647. In the example of FIG. 3, frame 0 of BTS1 timewise overlaps with frame 828 of BTS2.

Referring now to FIG. 4, each TDMA frame in GSM is divided into eight time slots TS, numbered time slot 0 through time slot 7. As shown in FIG. 5, each GSM time slot is further divided into 625 quarter bits QB, so that during each time slot a total of 625/4=156.25 bits are transmitted. The real time difference RTD between BTS2 and BT1 is thus conventionally expressed as the triplet (FND, TND, QND), wherein FND is the difference (FN2−FN1) between the TDMA frame numbers of BTS2 and BTS1, TND is the difference (TN2−TN1) between the time slot numbers of BTS2 and BTS1, and QND is the difference (QN2−QN1) between the quarter bit numbers of BTS2 and BTS1. For example, with reference to FIGS. 3–5, if quarter bit 0 of time slot 0 of frame 0 of BTS1 is aligned in time with quarter bit 37 of time slot 6 of frame 828 of BTS2, then the real time difference RTD between BTS2 and BTS1 is given by the triplet (FN2−FN1, TN2−TN1, QN2−QN1), where FN2, TN2 and QN2 are the frame number, time slot number and quarter bit number of BTS2, and FN1, TN1 and QN1 are the same parameters of BTS1. Thus, the triplet is (828−0, 6−0, 37−0), or simply (828, 6, 37).

When the mobile station MS1 receives from MLC the real time difference RTD between its own serving base transceiver station, for example BTS1 of FIG. 3, and another base transceiver station on which it is to make downlink time of arrival measurements, for example BTS2 of FIG. 3, the mobile station MS1 can use the RTD triplet (FND, TND, QND) along with the known frame structure timing (FN1, TN1, QN1) of the serving base transceiver station BTS1 to determine the frame structure timing of BTS2 relative to that of BTS1. The following calculations can be made by the mobile station MS1 to determine the current frame number FN2 of BTS2 at any given point (FN1, TN1, QN1) in the time base of BTS1.

$$QN2'=QN1+QND \quad \text{(Eq. 2)}$$

$$TN2'=TN1+TND+(QN2' \text{ div } 625) \quad \text{(Eq. 3)}$$

$$FN2'=FN1+FND+(TN2' \text{ div } 8) \quad \text{(Eq. 4)}$$

$$FN2=FN2' \text{ mod } 2{,}715{,}648 \quad \text{(Eq. 5)}$$

In the foregoing equations, "div" represents integer division, and "mod" is modulo n division, wherein "x mod n"="the remainder when x is divided by n".

The synchronization burst SB in GSM contains 78 encoded information bits and a predetermined 64 bit training sequence, as is well known in the art. The 78 encoded information bits contain BSIC and the so-called reduced frame number, conventionally expressed in three parts, T1, T2 and T3'. The conventional relationship between the frame number (FN) of the synchronization burst SB and the parameters T1, T2 and T3' is as follows:

$$T1=FN \text{ div } (26 \times 51) \quad \text{(Eq. 6)}$$

$$T2=FN \text{ mod } 26 \quad \text{(Eq. 7)}$$

$$T3=FN \text{ mod } 51 \quad \text{(Eq. 8)}$$

$$T3'=(T3-1) \text{ div } 10 \quad \text{(Eq. 9)}$$

Thus, once the current frame number FN2 of BTS2 has been calculated as shown above with respect to equations 2–5, then the parameter T3 can be determined by plugging FN2 into equation 8 above.

In conventional GSM networks, the synchronization burst SB occurs in time slot 0 of frames 1, 11, 21, 31 and 41 of a 51-frame repeating sequence of TDMA frames transmitted on the BTS's BCCH (broadcast control channels) carrier. Thus, T3 above indicates where the current frame FN2 is located within the 51-frame repeating sequence. Because, as mentioned above, the synchronization burst SB occurs in time slot 0 of frames 1, 11, 21, 31 and 41 of this 51-frame repeating sequence, the next T3 (call it T3n) that satisfies the relationship, (T3−1) mod 10=0, will designate the frame of BTS2 in which the next synchronization burst SB will occur. The corresponding frame number (call it FN2n) is then determined by:

$$FN2n=(FN2+DT3) \text{ mod } 2{,}715{,}648, \quad \text{(Eq. 10)}$$

where $DT3=(T3n-T3) \text{ mod } 51$.

Now, the parameters T1, T2 and T3' can be determined by plugging FN2n into equations 6 and 7 and plugging T3n into equation 9. According to the GSM standard, the parameters T1, T2 and T3', along with the BSIC, can be expressed using 25 bits. The BSIC bits can be determined from the BSIC information received at MS1, and the bits representing T1, T2 and T3' can be determined from equations 6, 7 and 9. The mobile station MS1 can then apply to the aforementioned 25 bits, a well known coding algorithm described in the GSM standard (ETSI GSM Specification 05.03), in order to generate from those 25 bits the 78 encoded bits in the synchronization burst.

In this manner, the mobile station MS1 now knows, with respect to the frame structure timing of its own serving BTS1, the frame number FN2n of BTS2 in which the synchronization burst will occur. As mentioned above, the synchronization burst always occurs in time slot 0, so the mobile station MS1 now knows exactly when the synchronization burst will be transmitted by BTS2. Moreover, the mobile station MS1 now also knows all 78 encoded bits along with all 64 training bits of the synchronization burst. With knowledge of 142 bits rather than just 64 bits, the mobile station can achieve better accuracy in making time of arrival measurements than in the conventional situation wherein only 64 bits are known. Moreover, with 142 known bits, it is possible for the mobile station MS1 to achieve, in a far noisier environment, the same accuracy as could be achieved using 64 bits in a less noisy environment.

Figure 7:
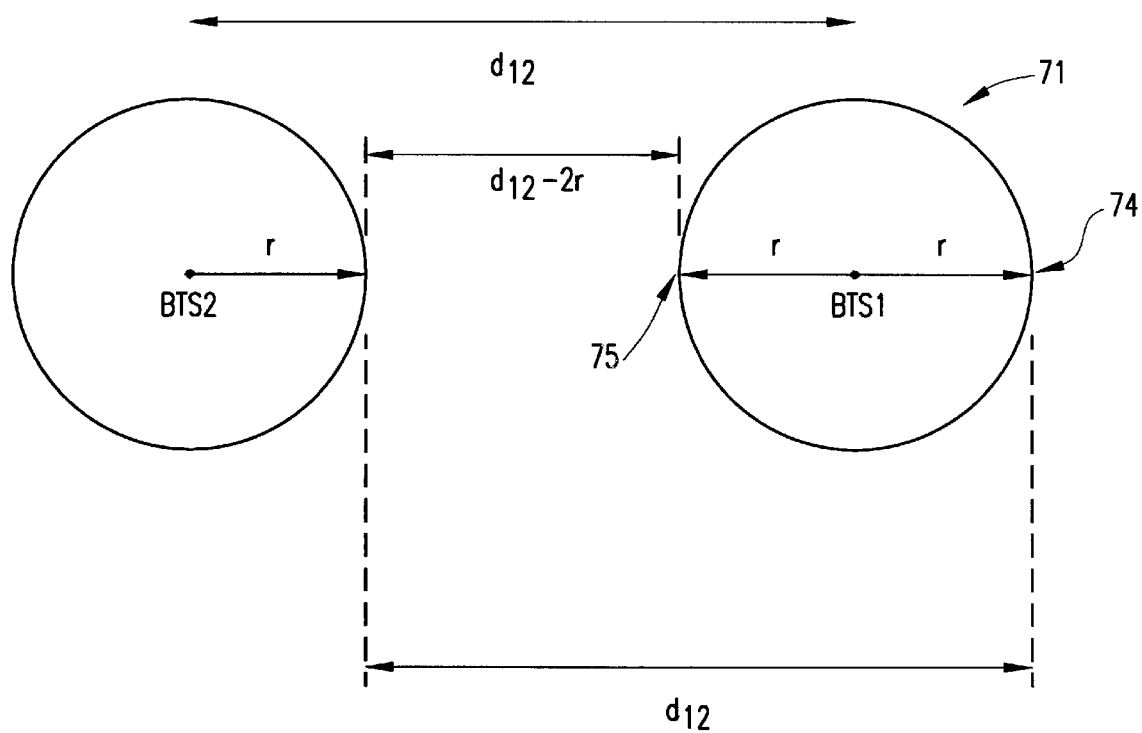
FIG. 7 illustrates how an example downlink monitoring window is determined according to the invention.

Because the position of the mobile station MS1 relative to a given neighboring BTS (e.g., BTS 28 of FIG. 2) is not known, the synchronization burst SB from that BTS will not arrive at the mobile station MS1 at precisely the time that was calculated by the mobile station. FIG. 7 illustrates one example of how a search window can be defined to encompass the time at which the synchronization burst can be expected to arrive at the mobile station MS1. Let FN denote the frame number of the next SB (SB2) that is expected to arrive from neighboring (non-serving) BTS2. How this frame number is calculated can be found in Eq. 10. MS1 knows when the corresponding SB (SB1) with the same frame number will arrive, or would have arrived, from the serving BTS1. Let this time instant be denoted by T0, relative to the mobile station's timebase.

MS1 is within the circle 71. The radius r of this circle can e.g., be determined by the cell radius or derived from the timing advance value. Consider the two extreme cases. One extreme case is when MS1 is at 74. Then SB2 arrives at time T0+RTD+d12/c since SB2 travels d12 further than SB1 does. The other extreme case is when MS1 is at 75. Then SB2 arrives at T0+RTD+(d12−2r)/c. Thus, when the mobile is between 75 and 74, SB2 arrives in the window [T0+RTD+(d12−2r)/c−k, T0+RTD+d12/c+k], where k accounts for inaccuracies in the provided RTD and d12 values.

Since RTD is known, MS1 can predict with a certain uncertainty when the SB2 from BTS2 (non serving) will arrive.

The ability to calculate a search window permits the synchronization burst to be detected with higher reliability compared to when the arrival time is completely unknown, and the complexity of the mobile station is reduced compared to prior art mobile stations. For example, data from the whole search window can be received in real time and stored for later processing, which is not realistically feasible if the search window is required to be 10 TDMA frames long, as is necessary to guarantee capturing the synchronization burst using conventional techniques. In addition, the search window permits the total measurement time to be reduced.

Use of the RTD knowledge to calculate the starting time and search window for the synchronization burst SB can significantly reduce the measurement time in making downlink OTD measurements. Without receiving the RTD information, the mobile station is conventionally required to search continuously until the frequency correction burst is detected, so that the mobile station knows the synchronization burst will occur in the next frame. With RTD information corresponding to all base transceiver stations to be measured, the mobile station can schedule the various measurements and limit the monitoring times to the search window periods, which is not possible using the prior art scanning techniques.

Figure 6:
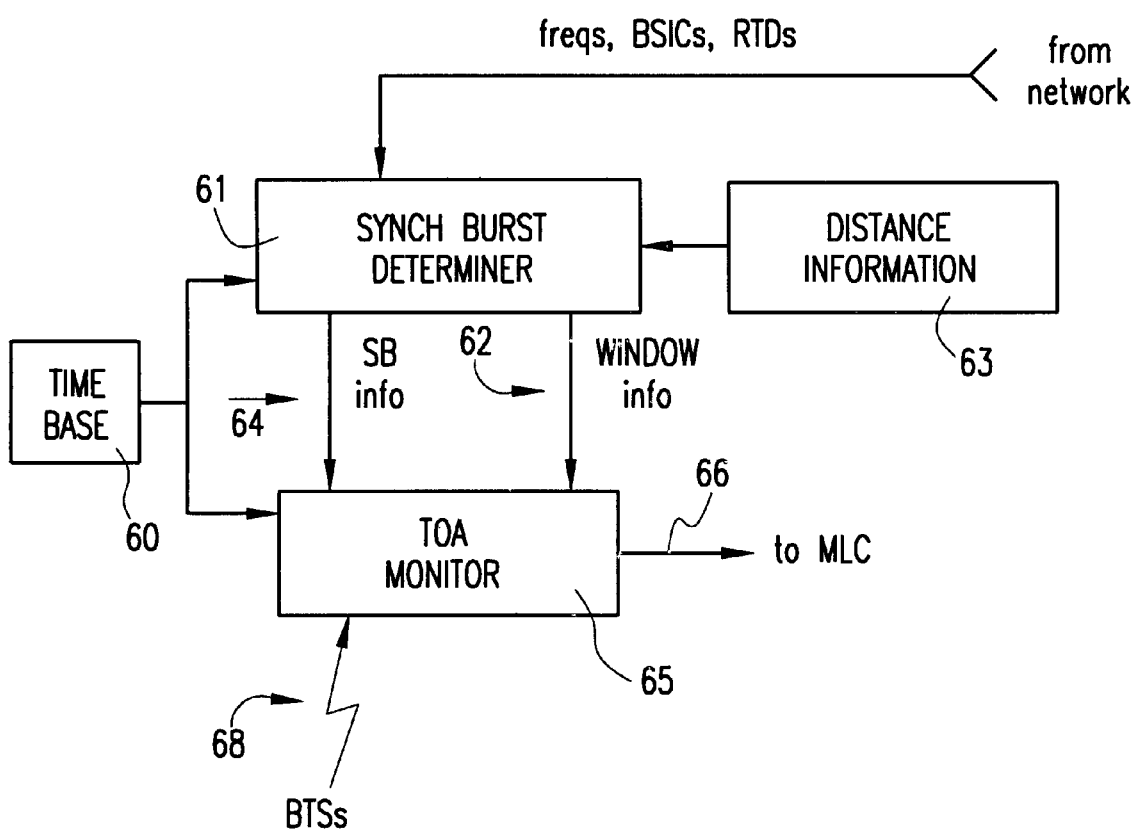
FIG. 6 illustrates pertinent portions of a mobile station having downlink observed time difference measurement capability according to one embodiment of the present invention.

FIG. 6 illustrates an example implementation of a pertinent portion of the mobile station MS1 of FIG. 2 for making downlink observed time difference measurements according to the present invention. The mobile station includes a synchronization burst determiner 61 which receives as input (for example from MLC of FIG. 2 via MSC, BSC 21 and BTS 23) the frequency, the BSIC, and the RTD relative to the serving base transceiver station, of each base transceiver station selected for OTD measurements. The synchronization burst determiner also receives information about the distances between its serving base transceiver station and all neighboring base transceiver stations, along with cell radius information for all neighboring base transceiver stations. This information can be periodically updated by MLC (as MS1 roams), and stored into a memory as shown at 63 in FIG. 6, or the information can be included in the positioning request message provided to the synchronization burst determiner by MLC.

The synchronization burst determiner 61 determines for each selected BTS the approximate expected arrival time of the synchronization burst relative to the frame structure time base 60 of the serving cell (serving base transceiver station), and outputs this information at 64 to a time of arrival monitor 65. Also at 64, the synchronization burst determiner outputs to the time of arrival monitor the 78 encrypted bits and the 64 training bits of the synchronization burst of each selected BTS. The synchronization burst determiner also calculates search windows for each selected base transceiver station, and outputs this search window information at 62 to the time of arrival monitor.

The time of arrival monitor makes time of arrival measurements on the signals received from the BTSs at 68. The time of arrival monitor can use the calculated arrival time information, the window information and the 142 bit sequence information to make time of arrival measurements for each selected base transceiver station. With this information, the time of arrival monitor can efficiently schedule the various measurements and, as necessary, can capture and store the signals received during the various search windows, and then process those signals at a later time. The processing of the received signals for determination of time of arrival can be done in any desired conventional manner, or in the manners described in detail in copending U.S. Ser. No. 08/978,960 filed on Nov. 26, 1997, which is hereby incorporated herein by reference.

After the desired time of arrival measurements have been made, the time of arrival monitor can output at 66 either the time of arrival information or the observed time difference information to the MLC (via BTS 23, BSC 21 and MSC). The MLC then uses this information in conventional fashion to determine the location of the mobile station MS1, which location is then provided in a suitable message to the requesting application 21 in FIG. 2. Alternatively, if MS1 knows the geographic locations of the measured BTSs, then MS1 can calculate its own position.

Although OTD measurements on the GSM synchronization burst are described in detail above, it should be clear that the techniques of the invention are applicable to various other types of bursts as well.

In CDMA systems such as those mentioned above, providing RTD information to the mobile station results in significant improvements over known downlink OTD techniques. The mobile station can use the RTD information to calculate a search window generally in the manner described above with respect to FIG. 7. Because the mobile station now knows the timing differences between its serving base transceiver station and the respective neighboring base transceiver stations, the geometry of FIG. 7 can be used as above to determine search windows for the respective neighboring base transceiver stations.

Then, for a given base transceiver station, the FSC peak detection and associated SSC correlations need be performed only during the search window in which the FSC and SSC signals are expected to arrive at the mobile station. Moreover, because the RTD information identifies not only when the mobile station should monitor for arrival of signals from a given base transceiver station, but also identifies the base transceiver station and its code group, the SSC pattern associated with the base transceiver station can be a priori determined by the mobile station. Thus, for the base transceiver station of interest, the FSC peak detection and the FSC-SSC correlation can be performed simultaneously, thereby advantageously reducing acquisition time significantly as compared to the above-described known techniques wherein FSC-SSC correlation must follow FSC peak detection. Reduction in acquisition time permits a corresponding reduction in the length of the idle periods during which the time of arrival information is acquired. Such reduction in the idle periods improves the downlink capacity of the network.

As a further result of the mobile station's a priori knowledge of the SSC pattern, there is no need to correlate the FSC peaks with several SSC patterns, as in the known techniques. This reduces memory and computation requirements in the mobile station.

Because the FSC peak detection and the FSC-SSC correlation are performed simultaneously, the results of these two operations can be combined for each time slot, which provides improved signal strength and thus improved hearability.

Because a search window is established for each monitored base transceiver station, the probability of selecting signals from the wrong base transceiver station is significantly reduced. Furthermore, because the correlations are performed only in the vicinity of the true peak, the probability of selecting a false peak is also reduced.

Another advantage of providing the RTD information to the mobile station is that, with the RTD information and corresponding search window, the mobile station can correlate with signals other than the FSC and SSC. For example, a mobile station can correlate with a broadcast channel of the base transceiver station (for example a broadcast channel identified from a neighbor list of neighboring base transceiver stations) instead of, or in addition to, FSC/SSC. Along with the RTD information, the network can identify for the mobile station the respective code groups of the base transceiver stations, and also the respective long (spreading) codes of the broadcast channels. From the code group identification information and the long code identification information, the mobile station can, using conventional techniques, generate the entire long code (e.g., 40,960 chips) of the broadcast channel of a given base transceiver station.

A broadcast channel, for example the Common Control Physical Channel CCPCH of the aforementioned WCDMA communications systems, typically has a power level on the same order as the sum of the FSC signal power plus the SSC signal power. Also, such broadcast channel is transmitted continuously, rather than ten percent of the time as with FSC/SSC. Accordingly, the signal of the broadcast channel contains much more energy than the FSC/SSC signals. This higher energy level provides improved hearability and permits faster acquisition.

Because the broadcast channel signal is continuously transmitted, it permits a much higher utilization of idle periods than can be achieved using FSC/SSC. For example, in any given time slot, the broadcast channel provides ten times as many symbols for correlating than does FSC/SSC. This permits the use of shorter and/or less frequent idle periods, thus further improving the downlink capacity of the network.

Because the broadcast channel represents only one "code", the amount of memory needed for non-coherent combining is half of that required when correlating FSC and SSC (two codes) Also, because base transceiver stations in the same vicinity will have unique broadcast channels, the probability of selecting the wrong base transceiver station is negligible. The unique channels provide cross-correlation properties that are much better (lower cross-correlation) than with FSC/SSC, so the probability of selecting a false peak is much smaller than when using FSC/SSC.

Figure 8:
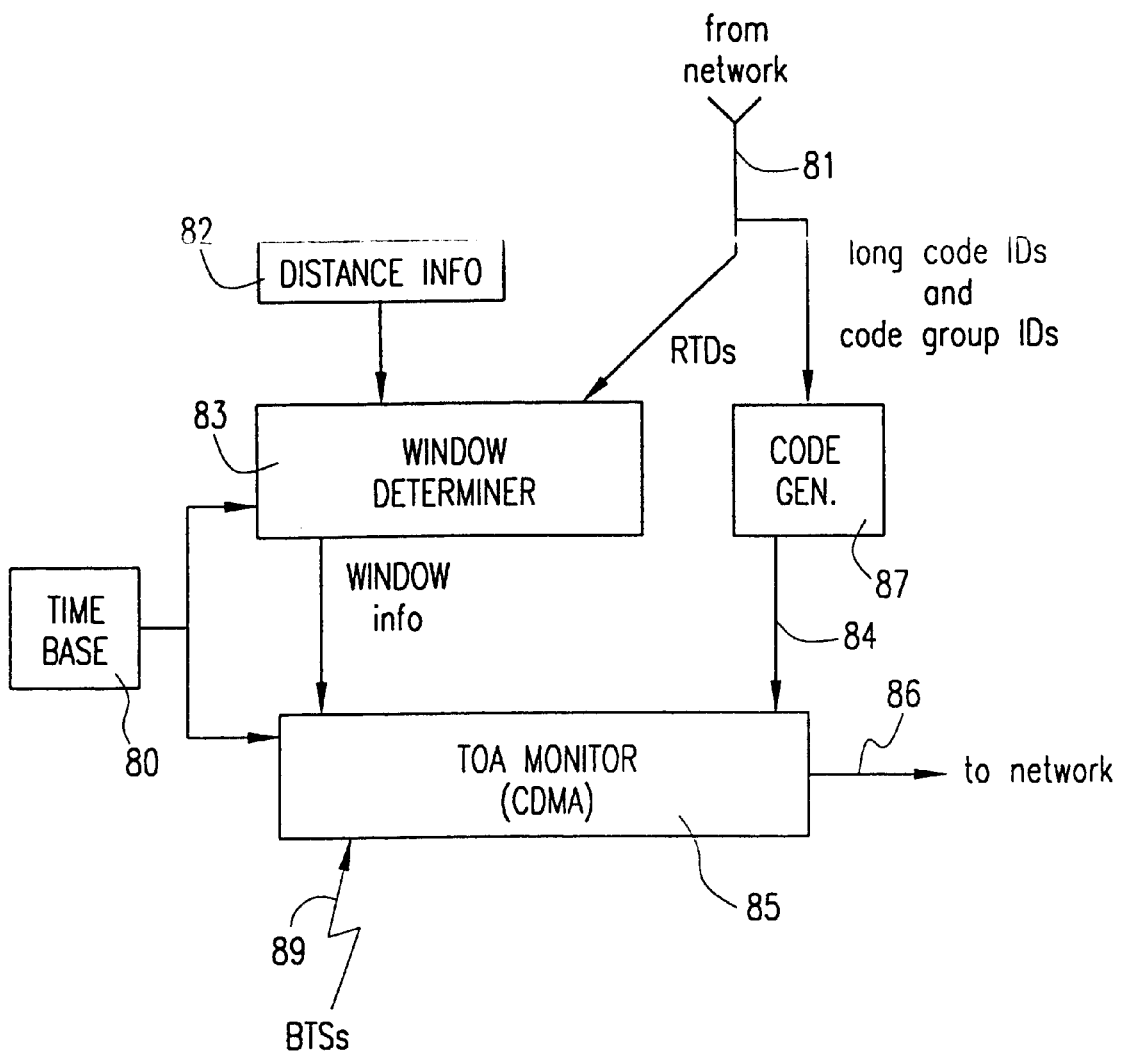
FIG. 8 illustrates pertinent portions of a mobile station having downlink observed time difference measurement capabilities according to further embodiments of the present invention.

FIG. 8 diagrammatically illustrates pertinent portions of an example mobile station which can perform downlink OTD measurements in CDMA systems such as mentioned above. Such CDMA systems can have generally the same architecture as shown in FIG. 2, but with the air interface implemented according to CDMA or WCDMA techniques. The mobile station of FIG. 8 includes an input 81 for receiving from the network (e.g., MLC of FIG. 2) RTD information indicative of the real time differences between the serving base transceiver station and the respective neighboring base transceiver stations on which the mobile station is to perform downlink OTD measurements. The input 81 also receives from the network code group identification information for each base transceiver station. In an embodiment wherein broadcast channels are to be measured, the input 81 receives, in addition to the code group identification information, long code identification information for the broadcast channel of each base transceiver station.

A window determiner 83 receives the RTD information from the network, calculates search windows generally in the manner described above with respect to FIG. 7, and outputs the window information to a CDMA time of arrival (TOA) monitor 85. The monitor 85 performs the required operations (e.g., peak detection and correlation) to produce the time of arrival measurement for each desired base transceiver station.

In an embodiment using FSC/SSC monitoring, a code generator 87 receives from input 81 code group identification information for each base transceiver station, generates therefrom the SSC patterns, and at 84 provides these SSC patterns to the monitor 85. In another embodiment wherein broadcast channels are to be measured, the code generator 87 also receives from input 81 long code identification information for the broadcast channel of each base transceiver station, generates the long codes in response to the code group identification information and the long code identification information, and at 84 provides the long codes to the monitor 85.

The monitor 85 monitors the CDMA air interface at 89 in accordance with the search windows, and makes the desired time of arrival measurements. The monitor 85 can output to the network at 86 either the TOA information or the OTD information. The network (e.g., MLC of FIG. 2) can use this information in conventional fashion to determine the location of the mobile station. Alternatively, if the mobile station knows the geographic locations of the measured base transceiver stations, then the mobile station can calculate its own position.

The window determiner 83 can receive input information about the distances between its serving base transceiver station and all neighboring base transceiver stations, along with cell radius information for all neighboring base transceiver stations, in order to assist the window determiner in determining the search windows. The distance information can be periodically updated by MLC (as the mobile station roams), and stored into a memory as shown at 82 in FIG. 8, or the information can be included in a positioning request message sent to the mobile station by MLC. The window determiner uses the RTD information to determine for each monitored base transceiver station the approximate expected arrival time of the monitored signal relative to the time base 80 of the serving base transceiver station, and combines this expected arrival time information with the distance information to produce a suitable search window.

It will be evident to workers in the art that the exemplary mobile station portions of FIG. 6 and FIG. 8 can be readily implemented by suitably modifying hardware, software, or both, in a data processing portion of a conventional mobile station.

In view of the foregoing description, it should be clear that the downlink observed time difference techniques of the present invention improve the sensitivity of downlink observed time difference measurements by providing the mobile station with more known bits from the synchronization burst SB, enhance the accuracy of the time of arrival and observed time difference measurements, reduce the risk of measurement errors, reduce the time required to make the necessary measurements, and require less memory and data processing capability in the mobile station.

Although exemplary embodiments of the present invention have been described above in detail, this does not limit the scope of the invention, which can be practiced in a variety of embodiments.

What is claimed is:

1. A method of using a mobile communication station in a wireless communication network to measure respective times of arrival of Code Division Multiple Access (CDMA) radio signals respectively transmitted by at least two radio transmitters in the network, said method comprising the steps of:

providing the mobile communication station with real time difference information indicative of differences between a time base used by a radio transmitter serving the mobile communication station and respective time bases used by the other radio transmitters;

providing the mobile communication station with information indicative of spreading codes used by the radio transmitter serving the mobile communication station and the other radio transmitters;

the mobile communication station determining, in response to the real time difference information and relative to the time base used by the radio transmitter serving the mobile communication station, a plurality of points in time at which the respective CDMA radio signals are expected to arrive at the mobile communication station;

determining, by the mobile communication station, the spreading codes used by the radio transmitter serving the mobile communication station, from the information indicative of the spreading codes; and for each CDMA radio signal, the mobile communication station monitoring, using the spreading codes, for arrival of the CDMA radio signal during a period of time after said point in time at which the CDMA radio signal is expected to arrive.

2. A method of using a mobile communication station in a wireless communication network to measure respective times of arrival of Code Division Multiple Access (CDMA) radio signals respectively transmitted by at least two radio transmitters in the network, said method comprising the steps of:

providing information indicative of when the CDMA radio signals are expected to arrive at the mobile communication station;

providing information indicative of spreading codes used by the at least two radio transmitters;

determining, by the mobile communication station and from the information indicative of the spreading codes, the spreading codes used by the at least two radio transmitters; and the mobile communication station monitoring for arrival of the CDMA radio signals of broadcast channels associated with the at least two radio transmitters using the spreading codes and based upon the information indicative of when the CDMA radio signals are expected to arrive.

3. The method of claim 2, wherein said providing step includes providing information indicative of respective periods of time during which the respective radio signals are expected to arrive at the mobile communication station, and said monitoring step including the mobile communication station monitoring for arrival of each radio signal during the corresponding period of time.

4. The method of claim 2, wherein said providing step further includes:

providing real time difference information indicative of differences between a time base used by a radio transmitter serving the mobile communication station and respective time bases used by the radio transmitters being measured; and in response to the real time difference information, determining, relative to the time base used by the serving radio transmitter, a plurality of points in time at which the respective radio signals are expected to arrive at the mobile communication station.

5. The method of claim 4, wherein said providing step further includes using the points in time to determine respective periods of time during which the respective radio signals are expected to arrive at the mobile communication station, and said monitoring step including the mobile communication station monitoring for arrival of each radio signal during the corresponding period of time.

6. The method of claim 5, wherein said using step includes the mobile communication station using the points in time to determine the respective periods of time.

7. The method of claim 5, wherein said using step includes accounting for respective distances to be traveled by the radio signals in order to reach the mobile communication station.

8. The method of claim 7, wherein said accounting step includes estimating, for each radio signal, a maximum possible distance of travel and a minimum possible distance of travel.

9. The method of claim 8, wherein said accounting step includes, for each radio signal, establishing a beginning point of the associated period of time based on the point in time at which arrival is expected and the minimum possible distance of travel, and establishing an ending point of the associated period of time based on the point in time at which arrival is expected and the maximum possible distance of travel.

10. The method of claim 4, wherein said determining step includes the mobile communication station determining the points in time.

11. The method of claim 2, wherein the wireless communication network is a cellular communication network.

12. The method of claim 2, wherein the wireless communication network is a CDMA network.

13. A method of locating the position of a mobile communication station in a wireless communication network, comprising:

receiving spreading code information;

determining from the received spreading code information the spreading codes used by at least two radio transmitters in the wireless communication network;

measuring at the mobile communication station respective times of arrival of Code Division Multiple Access (CDMA) radio signals respectively transmitted by the at least two radio transmitters in the network, including providing information indicative of when the CDMA radio signals are expected to arrive at the mobile communication station, and the mobile communication station monitoring for arrival of the CDMA radio signals using the spreading codes and based upon the information indicative of when the CDMA radio signals are expected to arrive; and using the measured times of arrival to locate the position of the mobile communication station.

14. A method of determining the time of arrival of a Code Division Multiple Access (CDMA) radio signal from at least two radio transmitters at a radio communication station operating in a wireless communication network, said method comprising the steps of:
  obtaining from the wireless communication network information from which an informational content of the CDMA radio signal can be determined but which information does not itself reveal the informational content of the CDMA radio signal;
  determining the informational content of the CDMA radio signal in response to the information;
  receiving code group identification information and generating long codes therefrom;
  monitoring for arrival of CDMA radio signals during a predetermined time interval in response to the information and the long codes; and
  using the informational content of the CDMA radio signal to measure the time of arrival of the CDMA radio signal.

15. The method of claim 14, wherein said information includes information indicative of transmission timing of the CDMA radio signal.

16. The method of claim 15, wherein said transmission timing information is real time difference information indicative of a difference between a time base known to the radio communication station and a time base used by a radio transmitter from which the CDMA radio signal is to be transmitted.

17. The method of claim 14, wherein said information includes information indicative of a radio transmitter from which the CDMA radio signal is to be transmitted.

18. An apparatus for use in locating the position of a mobile communication station in a wireless communication network, comprising:
  a determiner for determining when each of a plurality of Code Division Multiple Access (CDMA) radio signals from at least two radio transmitters is expected to arrive at the mobile communication station;
  a radio signal monitor for measuring respective times of arrival of the CDMA radio signals, said radio signal monitor provided in the mobile communication station and having an input coupled to said determiner to receive therefrom information indicative of when the CDMA radio signals are expected to arrive at the mobile communication station, said monitor responsive to said information to monitor for arrival of the CDMA radio signals; and
  a code generator coupled to said radio signal monitor for providing thereto codes, the radio signal monitor using the codes to monitor for arrival of the CDMA radio signals.

19. The apparatus of claim 18, wherein said determiner is provided in the mobile communication station.

20. The apparatus of claim 18, wherein said determiner determines respective periods of time during which the respective radio signals are expected to arrive at the mobile communication station.

21. The apparatus of claim 18, wherein said determiner includes an input for receiving real time difference information indicative of differences between a time base used by a radio transmitter serving the mobile communication station and respective time bases used by radio transmitters which transmit the radio signals, said determiner responsive to the real time difference information for determining, relative to the time base used by the serving radio transmitter, a plurality of points in time at which the respective radio signals are expected to arrive at the mobile communication station.

22. The apparatus of claim 21, wherein said determiner is operable to use the points in time to determine respective periods of time during which the respective radio signals are expected to arrive at the mobile communication station.

23. The apparatus of claim 22, wherein said determiner is operable during determination of said periods of time to account for respective distances to be traveled by the radio signals in order to reach the mobile communication station, said determiner operable to estimate maximum possible distances of travel and minimum possible distances of travel and, for each radio signal, to establish a beginning point of the associated period of time based on the point in time at which arrival is expected and the minimum possible distance of travel, and to establish an ending point of the associated period of time based on the point in time at which arrival is expected and the maximum possible distance of travel.

24. The apparatus of claim 18, wherein the wireless communication network is a cellular communication network.

25. The apparatus of claim 18, wherein the wireless communication network is a CDMA network.

26. The apparatus of claim 18, wherein said codes include spreading codes respectively associated with said CDMA radio signals.

27. The apparatus of claim 18, wherein said codes include codes carried by said CDMA radio signals.

28. The apparatus of claim 27, wherein said codes include code patterns respectively associated with radio transmitters used to produce the respective CDMA radio signals.

29. The apparatus of claim 18, wherein said code generator includes an input for receiving code identification information responsive to which said codes are provided.

30. The apparatus of claim 18, wherein said code generator is provided in the mobile communication station.

31. An apparatus for measuring the time of arrival of a Code Division Multiple Access (CDMA) radio signal thereat, comprising:
  an input for receiving information from which an informational content of the CDMA radio signal can be determined but which information does not itself reveal the informational content of the CDMA radio signal;
  a determiner coupled to said input and responsive to said information for determining the informational content of the CDMA radio signal;
  a code generator for receiving code group identification information and generating long codes therefrom; and
  a radio signal monitor for measuring the time of arrival of the CDMA radio signal, said radio signal monitor coupled to said determiner for using said informational content of the CDMA radio signal in measuring the time of arrival of the CDMA radio signal, said radio signal monitor coupled to said code generator for receiving the long codes and for monitoring for arrival of the CDMA radio signals during a predetermined time interval in response to the information and the long codes.

32. The apparatus of claim 31, wherein said information includes information indicative of transmission timing of the CDMA radio signal.

33. The apparatus of claim 32, wherein said transmission timing information is real time difference information indicative of a difference between a time base known to the apparatus and a time base used by a radio transmitter from which the CDMA radio signal is to be transmitted.

34. The apparatus of claim 31, wherein said information includes information indicative of a radio transmitter from which the CDMA radio signal is to be transmitted.

35. The apparatus of claim 31, wherein the apparatus is a mobile radio communication station.

36. A method of using a mobile communication station in a wireless communication network to measure respective times of arrival of Code Division Multiple Access (CDMA) radio signals respectively transmitted by at least two radio transmitters in the network, comprising:

providing information indicative of when the radio signals are expected to arrive at the mobile communication station; and the mobile communication station monitoring for arrival of the radio signals in response to the information including the steps of:

correlating said radio signal with a first code that is periodically transmitted by the associated radio transmitter; and simultaneously with said correlating step, correlating said radio signal with a code pattern that includes a plurality of second codes which are sequentially transmitted by the associated radio transmitter such that each of the second codes in the code pattern is transmitted simultaneously with one of said periodic transmissions of the first code.

37. The method of claim 36, including providing, for each radio transmitter, information indicative of a code group to which the radio transmitter belongs, and further including the mobile communication station determining said code pattern in response to said code group information.

38. The method of claim 36, including detecting said transmitted first and second codes by combining results of said correlating steps.

39. A system for measuring respective times of arrival of Code Division Multiple Access (CDMA) radio signals respectively transmitted by radio transmitters, said system comprising:

a serving radio transmitter providing information indicative of when the CDMA radio signals are expected to arrive, said serving radio transmitter periodically transmitting a first code and sequentially transmitting a plurality of second codes such that each of the plurality of second codes in a code pattern is transmitted simultaneously with a periodic transmission of the first code; and a mobile communication station monitoring for arrival of the CDMA radio signals based upon the information provided by the serving radio transmitter, correlating the CDMA radio signals with the first code, substantially simultaneously correlating the CDMA radio signals with the code pattern that includes the plurality of second codes and determining the times of arrival of the CDMA radio signals based upon the correlated CDMA radio signals.

40. The system of claim 39, wherein said serving radio transmitter providing for each radio transmitter, information indicative of a code group to which each radio transmitter belongs, and further including the mobile communication station determining said code pattern in response to said code group information.

41. The system of claim 39, wherein said mobile communication station detecting said first and said second codes by combining results of the correlated radio signals.

* * * * *